US006400562B1

(12) United States Patent
Lee et al.

(10) Patent No.: US 6,400,562 B1
(45) Date of Patent: Jun. 4, 2002

(54) PORTABLE COMPUTER WITH DETACHABLE DECORATIVE PIECE

(75) Inventors: Chia-Chung Lee; Chih-Wen Chiang, both of Taipei (TW)

(73) Assignee: Compal Electronics, Inc., Taipei (TW)

(*) Notice: Subject to any disclaimer, the term of this patent is extended or adjusted under 35 U.S.C. 154(b) by 0 days.

(21) Appl. No.: 09/494,513

(22) Filed: Jan. 31, 2000

(51) Int. Cl.$^7$ ................................................ H05K 5/03
(52) U.S. Cl. .................... 361/683; 361/684; 361/685; 361/686; 361/725-727; D14/100; D14/102; D14/106; 312/223.1; 312/223.2
(58) Field of Search .......................... 361/683, 684, 361/686, 725, 726, 727; D14/100, 102, 106, 138, 248; 312/223.1, 223.2, 265; 439/53, 152, 153, 160

(56) References Cited

U.S. PATENT DOCUMENTS

| | | | | |
|---|---|---|---|---|
| 5,196,991 A | * | 3/1993 | Hsieh | 361/685 |
| 5,621,618 A | * | 4/1997 | Komiyama | 361/732 |
| 5,745,566 A | * | 4/1998 | Petrella et al. | 379/433 |
| 5,870,282 A | * | 2/1999 | Andre' et al. | 361/683 |
| 5,874,920 A | * | 2/1999 | Araki et al. | 343/702 |
| 5,898,774 A | * | 4/1999 | Shindo | 379/433 |
| 6,173,837 B1 | * | 1/2001 | Marconi | 206/457 |

* cited by examiner

*Primary Examiner*—Darren Schuberg
*Assistant Examiner*—David Foster
(74) *Attorney, Agent, or Firm*—Pillsbury Winthrop LLP (57) ABSTRACT

A portable computer includes a computer housing, a decorative piece and a mounting unit. The computer housing includes an upper housing part that is provided with a display unit, and a lower housing part that is connected to the upper housing part and that is provided with a keyboard unit. The computer housing has an outer wall surface that is formed with a mounting portion. The decorative piece is disposed on the mounting portion. The mounting unit is provided on the mounting portion and the decorative piece for mounting the decorative piece removably on the mounting portion of the outer wall surface of the computer housing.

6 Claims, 7 Drawing Sheets

PORTABLE COMPUTER WITH DETACHABLE DECORATIVE PIECE

BACKGROUND OF THE INVENTION

1. Field of the Invention

The present invention relates to a portable computer having a computer housing mounted with a detachable decorative piece so as to provide a variable appearance to the computer housing.

2. Description of the Related Art

Conventional portable computers generally have a computer housing with a non-changeable appearance and in a non-changeable color, often black or gray. It is not possible for the user to change the color and the appearance of the portable computer based on his preference or according to the occasion on which the portable computer is used.

SUMMARY OF THE INVENTION

Therefore, the object of the present invention is to provide a portable computer having a computer housing mounted with a detachable decorative piece so as to provide a changeable appearance to the computer housing.

Accordingly, the portable computer of the present invention includes a computer housing, a decorative piece and a mounting unit. The computer housing includes an upper housing part that is provided with a display unit, and a lower housing part that is connected to the upper housing part and that is provided with a keyboard unit. The computer housing has an outer wall surface that is formed with a mounting portion. The decorative piece is disposed on the mounting portion. The mounting unit is provided on the mounting portion and the decorative piece for mounting the decorative piece removably on the mounting portion of the outer wall surface of the computer housing.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
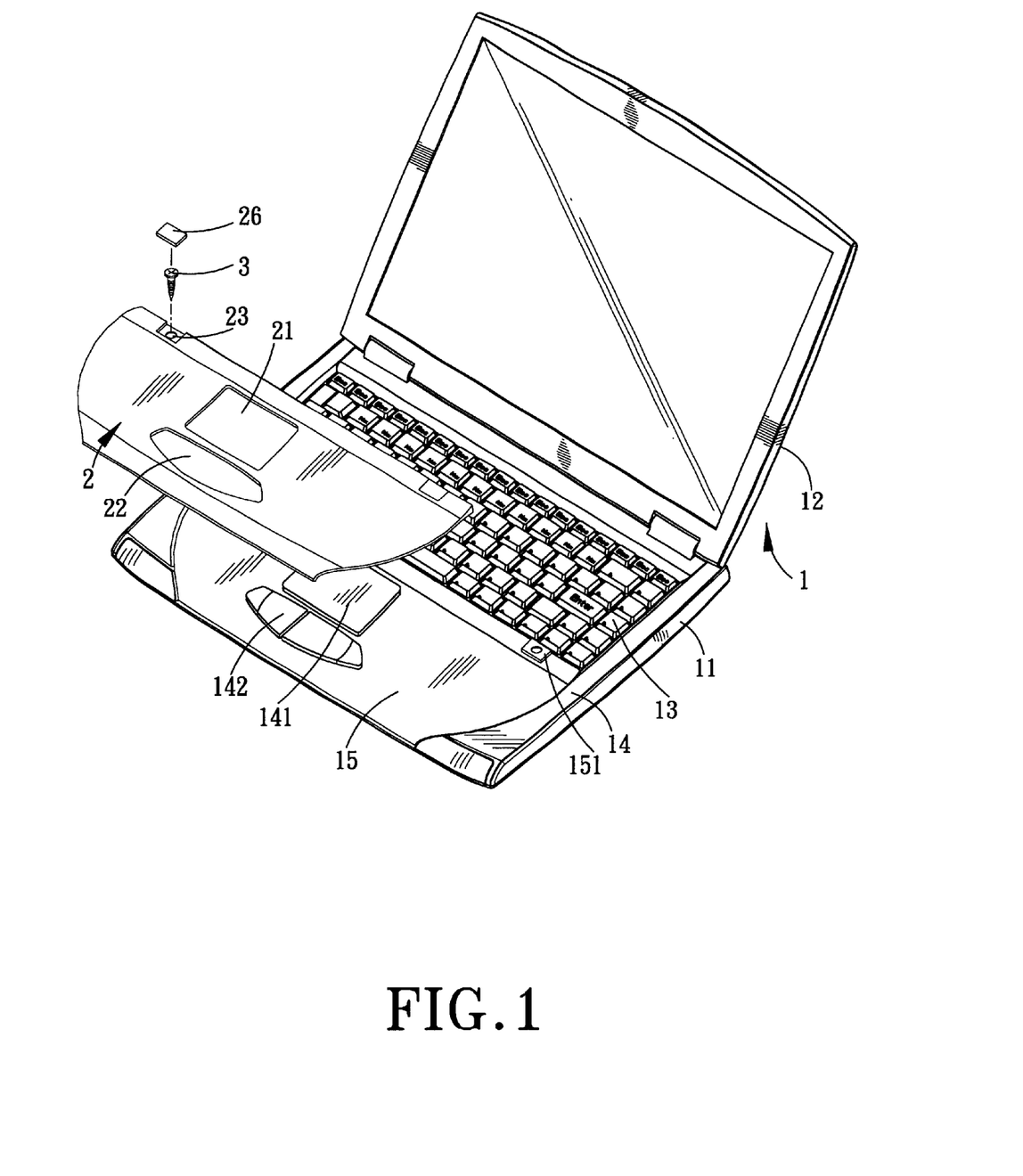
FIG. 1 is an exploded perspective view of a first preferred embodiment of the portable computer of the is present invention.

Referring to FIG. 1, the first preferred embodiment of the portable computer according to the present invention is shown to include a computer housing 1 and a decorative piece 2. The computer housing 1 includes an upper housing part 12 which has an inner side provided with a display unit, and a lower housing part 11 that is connected pivotally to the upper housing part 12. The lower housing part 11 has a top side 14 which is mounted with a keyboard unit 13, a touch pad 141 and function keys 142. An outer wall surface on the top side 14 of the lower housing part 11 is formed with a generally trapezoid first mounting portion 15 which is formed around the touch pad 141 and the function keys 142. The first mounting portion 15 is indented relative to the outer wall surface on the top side 14, and is formed with a pair of screw holes 151 adjacent to the keyboard unit 13.

The decorative piece 2 is disposed on the first mounting portion 15, and has openings 21, 22 formed therethrough to permit access to the touch pad 141 and the function keys 142. The decorative piece 2 is generally trapezoid in shape, and has a thickness generally conforming to the depth of the first mounting portion 15 so as to fit within the first mounting portion 15 and such that a top side of the decorative piece 2 is flush with the top side 14 of the lower housing part 11. The decorative piece 2 further has an edge portion formed with a pair of fastener holes 23 aligned respectively with the screw holes 151 in the first mounting portion 15. A pair of screw fasteners 3 extend through the fastener holes 23 and the screw holes 151 for fastening the decorative piece 2 to the first mounting portion 15. The screw holes 151 formed in the first mounting portion 15, the fastener holes 23 formed in the decorative piece 2, and the screw fasteners 3 thus constitute a first mounting unit for mounting the decorative piece 2 removably on the first mounting portion 15. Preferably, a pair of covers 26 are provided on the decorative piece 2 for covering the fasteners 3 and the fastener holes 23. The decorative piece 2 may be made of a flexible sheet material, such as leather and rubber, or a rigid sheet material, such as metal, wood and plastic, to provide a desired feeling of contact. The decorative piece 2 can be easily detached from the first mounting portion 15 for replacement, simply with the use of a screwdriver.

Figure 2:
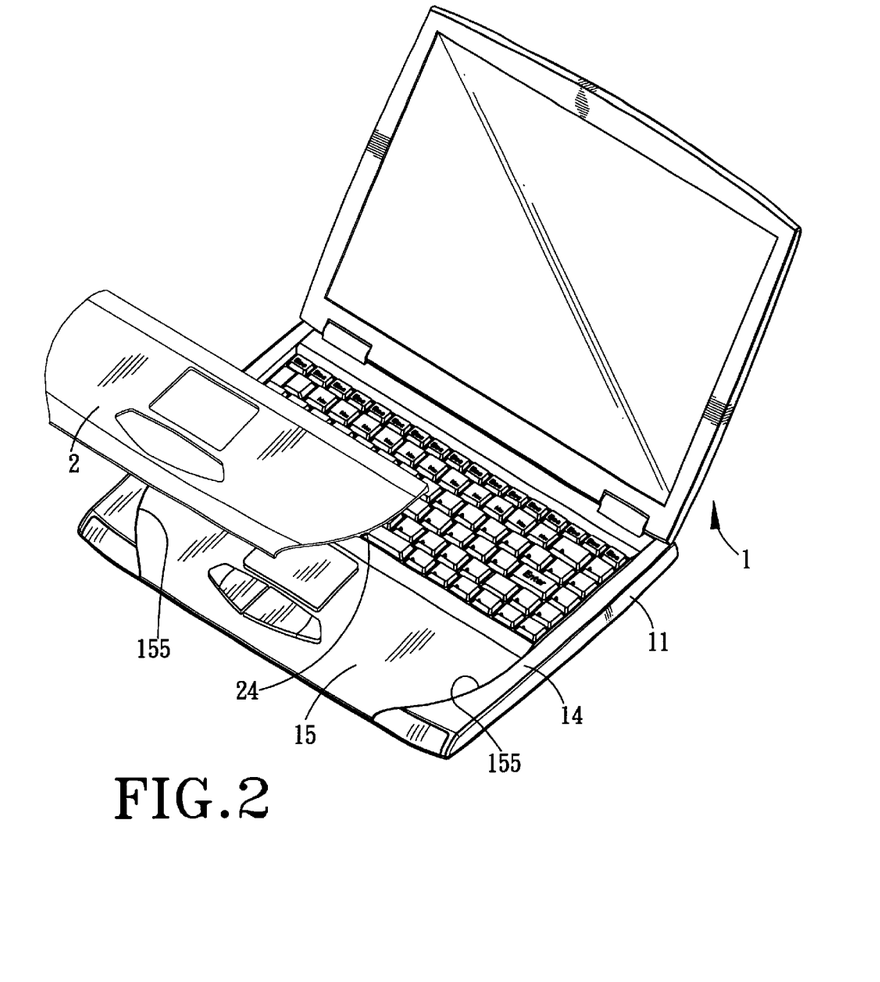
FIG. 2 is an exploded perspective view of a modified embodiment of the portable computer of the present invention.
Figure 2A:
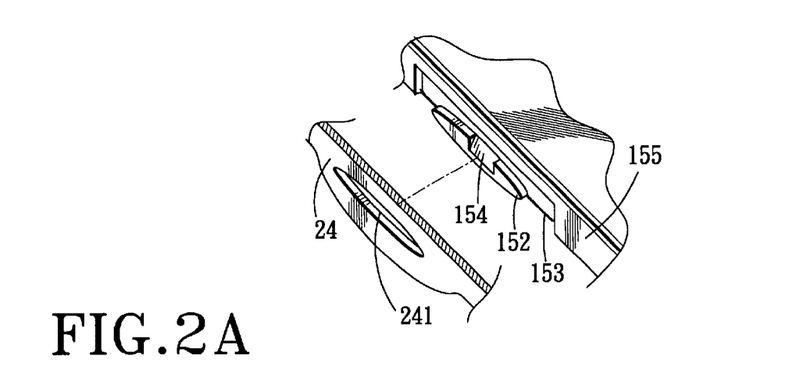
FIG. 2A is an enlarged fragmentary perspective view of the embodiment of FIG. 2.

Referring to FIGS. 2 and 2A, in a modified embodiment, the decorative piece 2 is mounted on the first mounting portion 15 via a pair of engaging protrusions 152 and a pair of resilient engaging plates 24. As the first mounting portion 15 is indented relative to the outer wall surface on the top side 14, a pair of shoulders 155 are formed at two lateral ends of the first mounting portion 15. The shoulders 155 are formed with confronting grooves 153, each of which is provided with one of the engaging protrusions 152. The decorative piece 2 has two opposite lateral edges, each of which has one of the engaging plates 24 projecting downwardly therefrom. Each of the engaging plates 24 is formed with an engaging hole 241 which has a shape conforming with that of a respective one of the engaging protrusions 152 for engaging releasably the respective one of the engaging protrusions 152. Each of the engaging protrusions 152 has an upper edge portion which is chamfered to form an inclined guiding surface 154. The engaging plates 24, which are formed with the engaging holes 241, and the engaging protrusions 152 constitute a second mounting unit for mounting the decorative piece 2 removably on the first mounting portion 15. When the decorative piece 2 is to be detached from the computer housing 1 for replacement with a different one, a flat tool bit of a screwdriver can be extended between a respective one of the lateral edges of the decorative piece 2 and an adjacent one of the shoulders 155 of the mounting portion 15 and along the guiding surface 154 so as to push the respective engaging plate 24 inwardly away from the adjacent shoulder 155, thereby disengaging the respective engaging protrusion 152 from the respective engaging hole 241.

Figure 3:
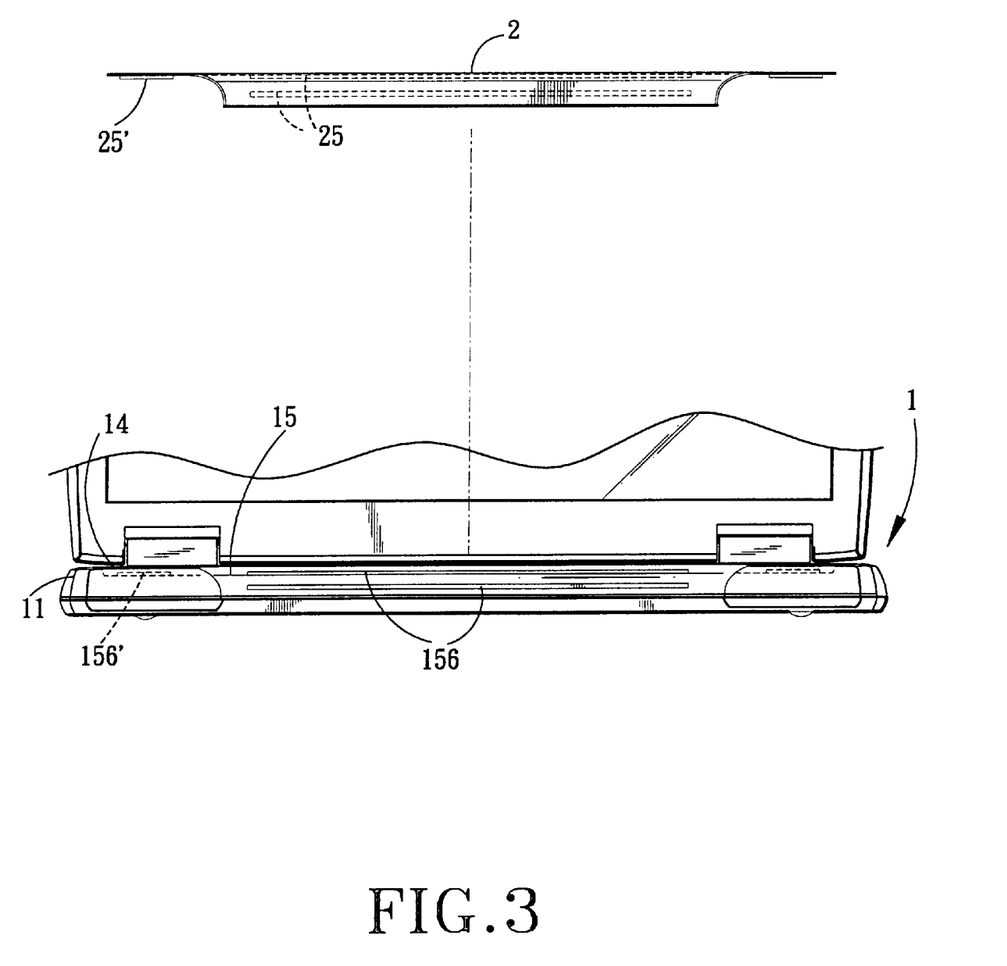
FIG. 3 is a fragmentary exploded perspective view of another modified embodiment of the portable computer of the present invention, viewed from a front side thereof.

Referring to FIG. 3, in another modified embodiment, the decorative piece 2 is mounted on the first mounting portion 15 via hook and loop fasteners which include a plurality of hook fastener units 156, 156' fixed to the first mounting portion 15, and a plurality of loop fastener units 25, 25' fixed to a bottom side of the decorative piece 2 for fastening releasably and respectively to the hook fastener units 156, 156'. The hook and loop fastener units 156, 156', 25, 25' thus constitute a third mounting unit for mounting the decorative piece 2 removably on the first mounting portion 15. For replacement, the decorative piece 2 can be easily detached from the lower housing part 11 of the computer housing 1 merely by pulling, without the need for a hand tool.

Figure 4:
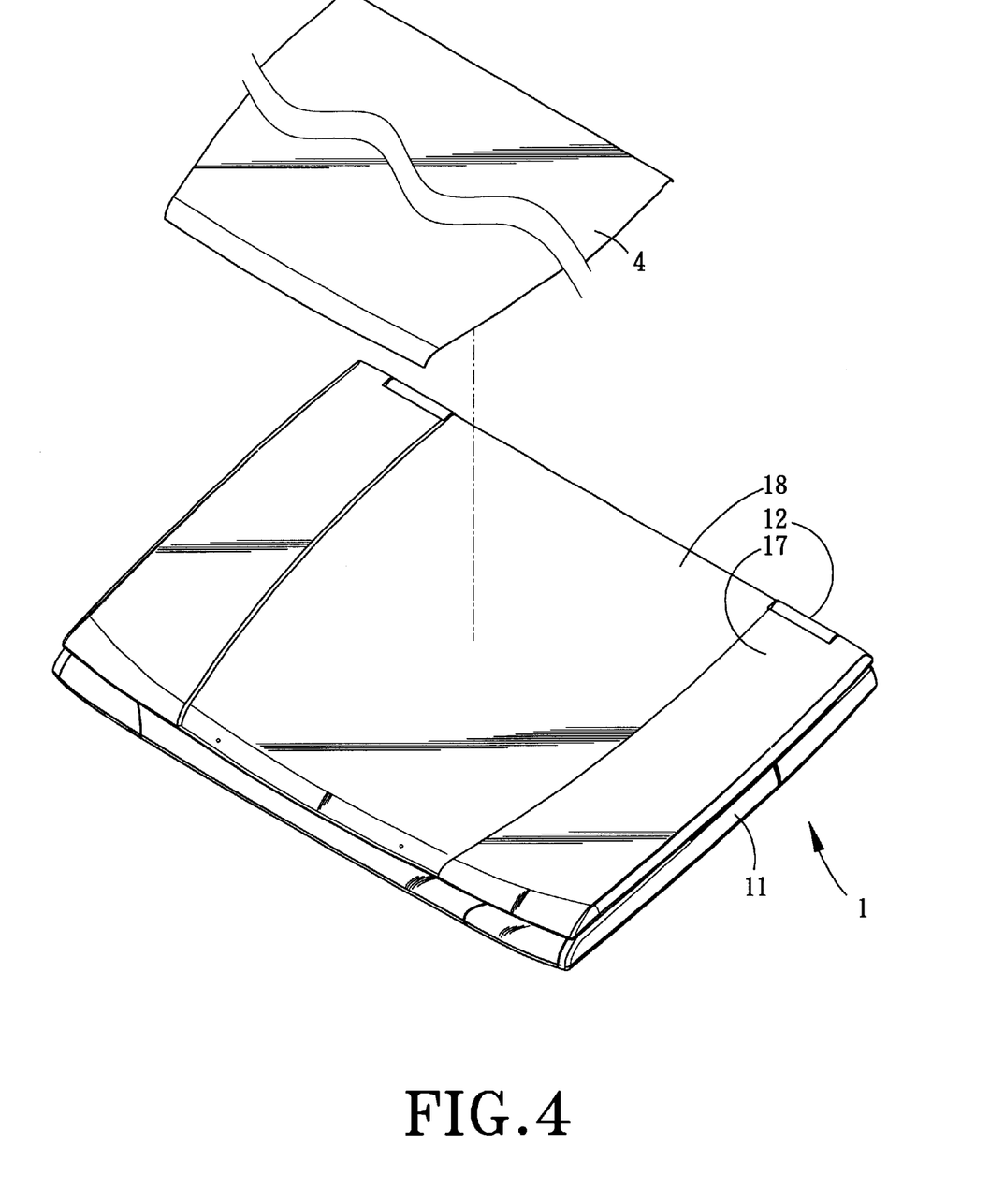
FIG. 4 is an exploded perspective view of another preferred embodiment of the portable computer of the present invention.
Figure 4A:
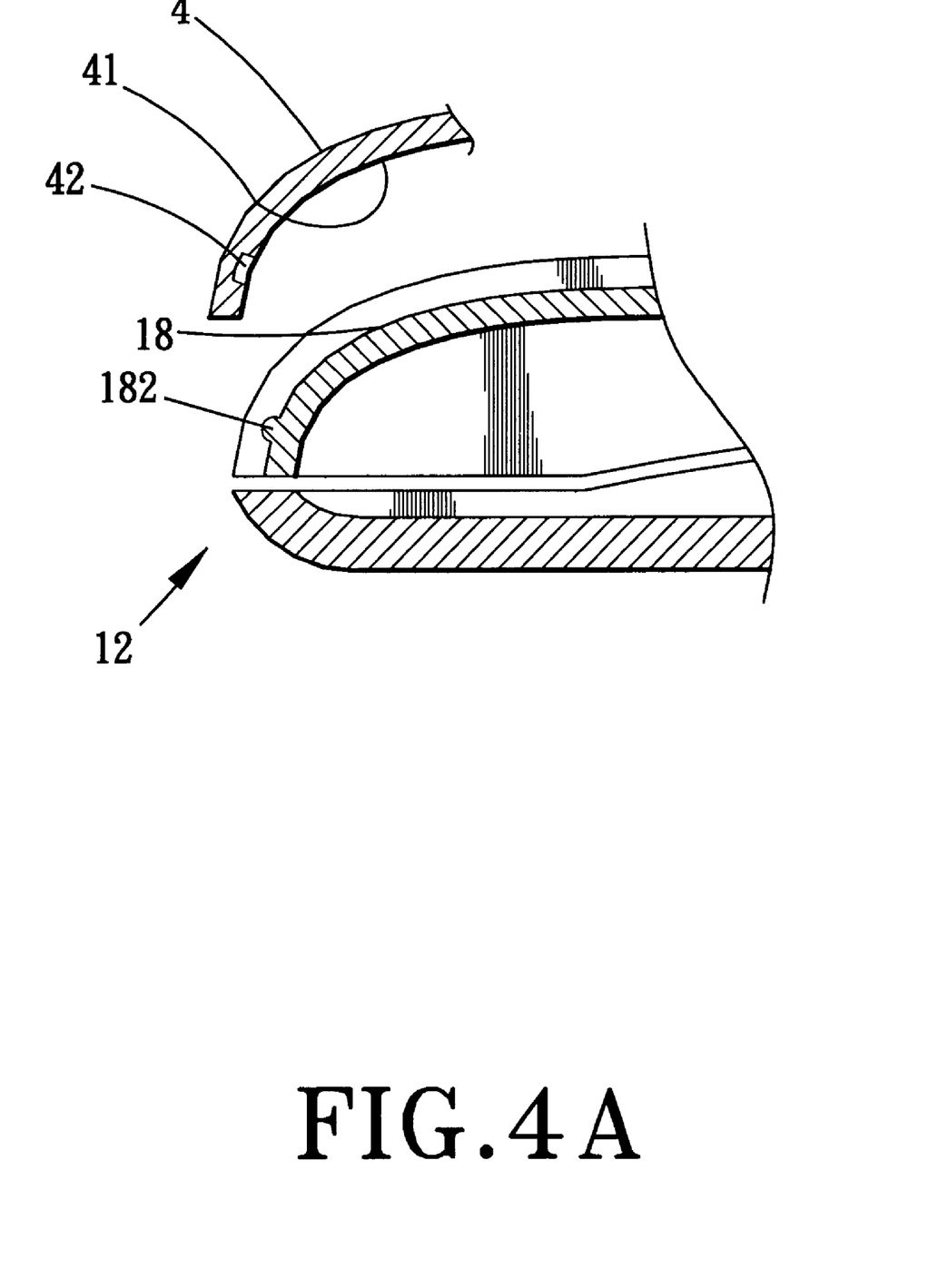
FIG. 4A is an enlarged fragmentary sectional view illustrating how a decorative piece is mounted on an upper housing part of the portable computer of FIG. 4.

Referring to FIGS. 4 and 4A, in another preferred embodiment of die portable computer of the present invention, a second mounting portion 18 is formed on an outer side 17 of the upper housing part 12 of the computer housing 1 opposite to the inner side that is provided with the display unit, and is indented relative to an outer wall surface on the outer side 17 of the upper housing part 12. As with the previous embodiments, a decorative piece 4 is disposed in the second mounting portion 18, and is configured to fit within the second mounting portion 18. The second mounting portion 18 has opposite front and rear ends formed with engaging protrusions 182. The decorative piece 4 has opposite front end rear ends formed with engaging grooves 42 on a bottom side 41 of the decorative piece 4 for engaging releasably and respectively the engaging protrusions 182. The engaging protrusions 182 and die engaging grooves 42 constitute a fourth mounting unit for mounting removably the decorative piece 4 on the second mounting portion 18.

Figure 5:
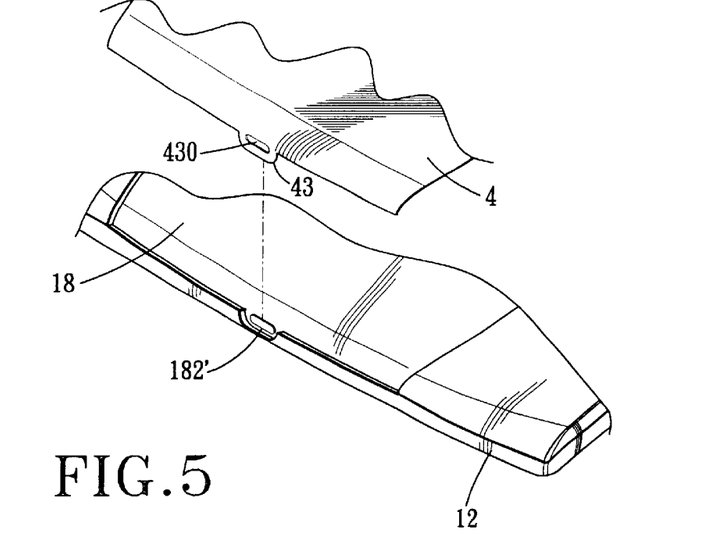
FIG. 5 is a fragmentary perspective view of a modified embodiment of the portable computer of the present invention.

Alternatively, as shown in FIG. 5, in a modified embodiment, the decorative piece 4 has an engaging plate 43 which projects from the front end of the decorative piece 4 and which is formed with an engaging hole 430 for engaging releasably a respective engaging protrusion 182' formed in the second mounting portion 18. The engaging plate 43, which is formed with the engaging hole 43, and the engaging protrusion 182' constitute a fifth mounting unit for mounting removably the decorative piece 4 on the second mounting portion 18.

Figure 6:
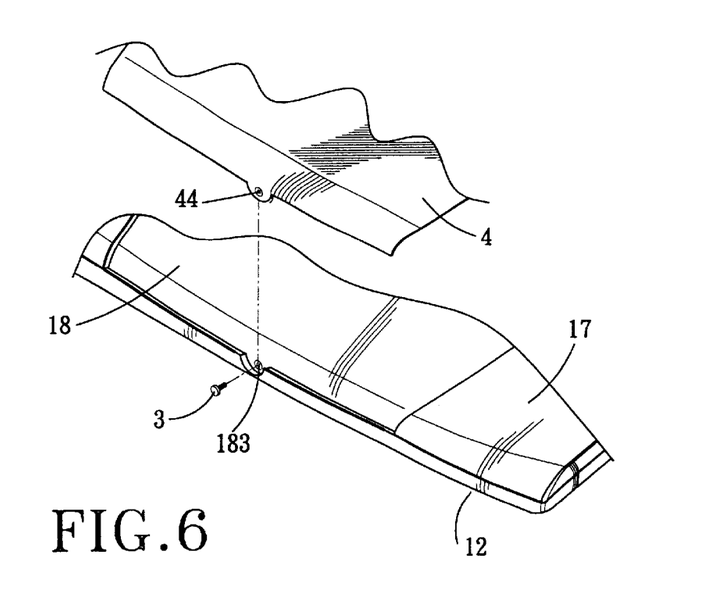
FIG. 6 is a fragmentary exploded perspective view of another modified embodiment of the portable computer of the present invention.

Referring to FIG. 6, in another modified embodiment, the decorative piece 4 is mounted on the second mounting portion 18 via a pair of screw holes 183 (only one is shown) formed in the front and rear ends of the second mounting portion 18 on the outer side 17 of the upper computer housing 12, a pair of fastener holes 44 (only one is shown) formed in the front and rear ends of the decorative piece 4, and screw fasteners 3 (only one is shown) extending through the fastener holes 44 and the screw holes 183 for fastening the decorative piece 4 to die mounting portion 18. The screw holes 183, the fastener holes 44, and the screw fasteners 3 constitute a sixth mounting unit for mounting removably the decorative piece 4 on the second mounting portion 18.

Figure 7:
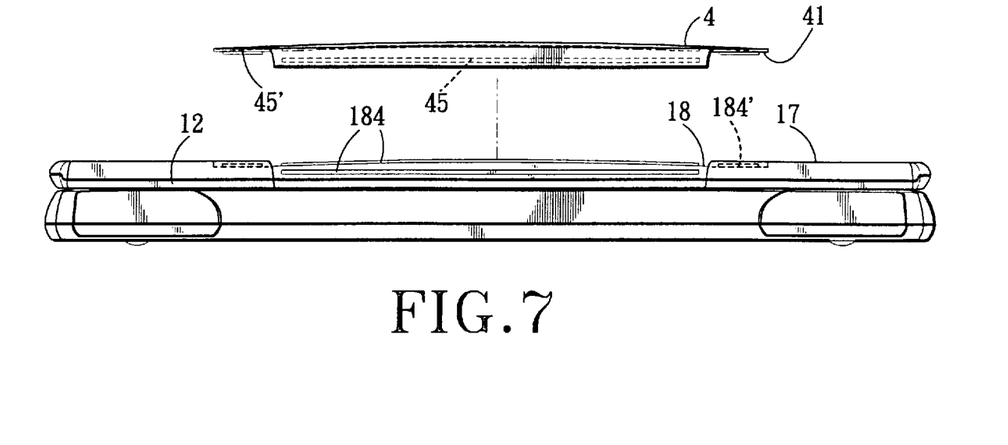
FIG. 7 is an exploded schematic view of yet another modified embodiment of the portable computer of the present invention, viewed from a front side thereof.

Alternatively, as shown in FIG. 7, in yet another modified embodiment, the decorative piece 4 is fastened to the second mounting portion 18 on the outer side 17 of the upper housing part 12 by means of a plurality of hook and loop fasteners which include hook fastener units 184, 184' provided securely on the second mounting portion 18, and loop fastener units 45, 45' provided securely on the bottom side 41 of the decorative piece 4 for fastening releasably and respectively to the hook fastener units 184, 184'. The hook and loop fastener units 184, 184', 45, 45' constitute a seventh mounting unit for mounting removably the decorative piece 4 on the second mounting portion 18.

Figure 8:
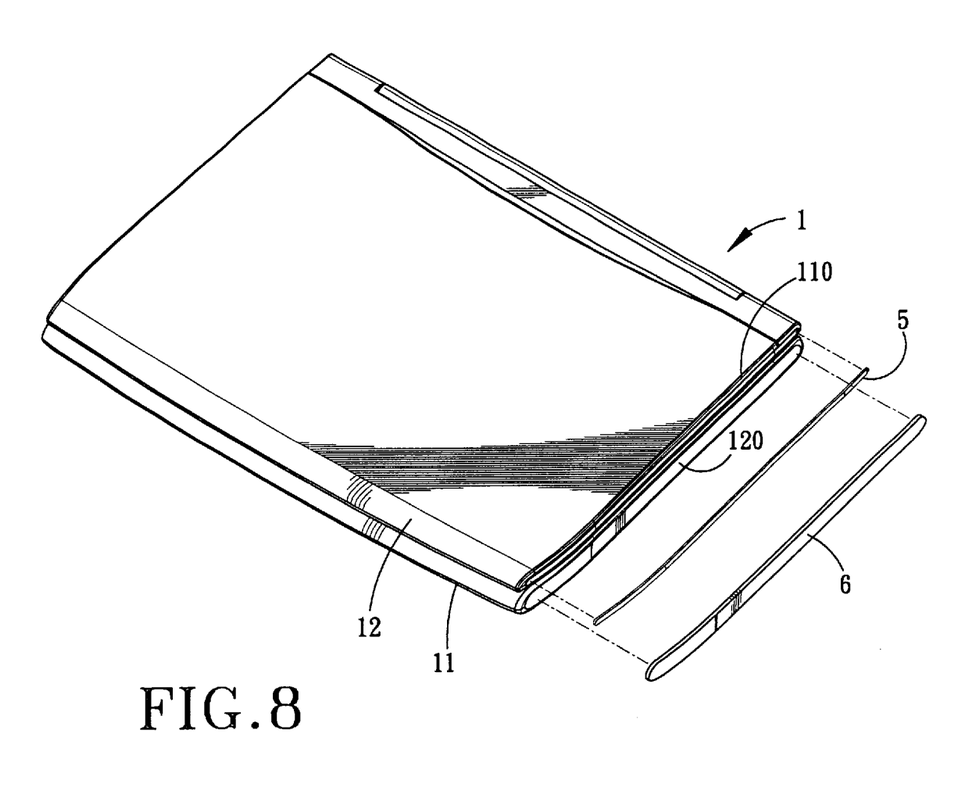
FIG. 8 is an exploded perspective view of a further preferred embodiment of the portable computer of the present invention.

Of course, the indented mounting portion may also be formed on any of the opposite front and rear sides and the opposite lateral sides of the upper and lower housing parts 11, 12. Referring to FIG. 8, in still another preferred embodiment, each of the upper and lower housing parts 12, 11 has a lateral side formed with an elongated third mounting portion 110, 120 which is indented relative to an outer wall surface on the lateral side of the respective one of the upper and lower housing parts 12, 11. Each of the third mounting portions 110, 120 is mounted with a complementary decorative piece 5, 6. The decorative pieces 5, 6 may be fastened releasably to the third mounting portions 110, 120 by using any of the aforementioned mounting means.

Therefore, according to the present invention, the computer housing 1 is mounted with a detachable decorative piece 2, 4 which can be easily detached by pulling, or with the use of a hand tool. The computer housing 1 thus has an appearance which can be changed as desired.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:
1. A portable computer, comprising: a computer housing which includes an upper housing part that is provided with a display unit and a lower housing part that is connected to said upper housing part and that has a top side mounted with a keyboard unit, said top side of said lower housing part having an outer wall surface formed with a mounting portion which is indented relative to said outer wall surface;

a decorative piece disposed on said mounting portion and configured to fit within said mounting portion; and a mounting unit provided on said mounting portion and said decorative piece for mounting said decorative piece removably on said mounting portion, wherein said lower housing part has a top side mounted with said keyboard unit, said mounting portion being formed on said top side of said lower housing part and being indented relative to said outer wall surface on said top side of said lower housing part, said decorative piece being configured to fit within said mounting portion, and said mounting unit includes a pair of screw holes formed in said mounting portion, a pair of fastener holes formed in said decorative piece, and a pair of screw fasteners extending through said fastener holes and said screw holes for fastening said decorative piece to said mounting portion.

2. A portable computer, comprising:

a computer housing which includes an upper housing part that is provided with a display unit and a lower housing part that is connected to said upper housing part and that has a top side mounted with a keyboard unit, said top side of said lower housing part having an outer wall surface formed with a mounting portion which is indented relative to said outer wall surface;

a decorative piece disposed on said mounting portion and configured to fit within said mounting portion; and a mounting unit provided on said mounting portion and said decorative piece for mounting said decorative piece removably on said mounting portion, wherein said lower housing part has a top side mounted with said keyboard unit, said mounting portion being formed on said top side of said lower housing part and being indented relative to said outer wall surface on said top side of said lower housing part, said decorative piece being configured to fit within said mounting portion, and said mounting portion has two lateral ends, and is formed with a pair of shoulders at said lateral ends, said decorative piece having opposite lateral edges, said mounting unit including a pair of engaging protrusions formed respectively on said shoulders, and a pair of resilient engaging plates projecting respectively from said lateral edges of said decorative piece, each of said engaging plates being formed with an engaging hole for engaging releasably a respective one of said engaging protrusions.

3. A portable computer, comprising:

a computer housing which includes an upper housing part that is provided with a display unit and a lower housing part that is connected to said upper housing part and that has a top side mounted with a keyboard unit, said top side of said lower housing part having an outer wall surface formed with a mounting portion which is indented relative to said outer wall surface;

a decorative piece disposed on said mounting portion and configured to fit within said mounting portion; and a mounting unit provided on said mounting portion and said decorative piece for mounting said decorative piece removably on said mounting portion, wherein said lower housing part has a top side mounted with said keyboard unit, said mounting portion being formed on said top side of said lower housing part and being indented relative to said outer wall surface on said top side of said lower housing part, said decorative piece being configured to fit within said mounting portion, and said mounting unit includes a hook and loop fastener provided on said mounting portion and said decorative piece.

4. A portable computer, comprising:

a computer housing which includes an upper housing part that has an inner side provided with a display unit and an outer side opposite to said inner side, and a lower housing part that is connected to said upper housing part and that is provided with a keyboard unit, said outer side of said upper housing part having an outer wall surface which is formed with a mounting portion that is indented relative to said outer wall surface;

a decorative piece disposed on said mounting portion and configured to fit within said mounting portion; and a mounting unit provided on said mounting portion and said decorative piece for mounting said decorative piece removably on said mounting portion, wherein said upper housing part has an inner side provided with said display unit, and an outer side opposite to said inner side, said mounting portion being formed on said outer side of said upper housing part and being indented relative to said outer wall surface on said outer side of said upper housing part, said decorative piece being configured to fit within said mounting portion, and said mounting unit includes a pair of screw holes formed in said mounting portion, a pair of fastener holes formed in said decorative piece, and a pair of screw fasteners extending through said fastener holes and said screw holes for fastening said decorative piece to said mounting portion.

5. A portable computer, comprising:

a computer housing which includes an upper housing part that has an inner side provided with a display unit and an outer side opposite to said inner side, and a lower housing part that is connected to said upper housing part and that is provided with a keyboard unit, said outer side of said upper housing part having an outer wall surface which is formed with a mounting portion that is indented relative to said outer wall surface;

a decorative piece disposed on said mounting portion and configured to fit within said mounting portion; and a mounting unit provided on said mounting portion and said decorative piece for mounting said decorative piece removably on said mounting portion, wherein said upper housing part has an inner side provided with said display unit, and an outer side opposite to said inner side, said mounting portion being formed on said outer side of said upper housing part and being indented relative to said outer wall surface on said outer side of said upper housing part, said decorative piece being configured to fit within said mounting portion, and each of said mounting portion and said decorative piece has opposite front and rear ends, said mounting unit including a pair of engaging protrusions formed respectively on said front and rear ends of said mounting portions, and a pair of engaging grooves formed respectively in said front and rear ends of said decorative piece for engaging releasably and respectively said engaging protrusions.

6. A portable computer, comprising:

a computer housing which includes an upper housing part that has an inner side provided with a display unit and an outer side opposite to said inner side, and a lower housing part that is connected to said upper housing part and that is provided with a keyboard unit, said outer side of said upper housing part having an outer wall surface which is formed with a mounting portion that is indented relative to said outer wall surface;

a decorative piece disposed on said mounting portion and configured to fit within said mounting portion; and a mounting unit provided on said mounting portion and said decorative piece for mounting said decorative piece removably on said mounting portion, wherein said upper housing part has an inner side provided with said display unit, and an outer side opposite to said inner side, said Mounting portion being formed on said outer side of said upper housing part and being indented relative to said outer wall surface on said outer side of said upper housing part, said decorative piece being configured to fit within said mounting portion, and said mounting unit includes a hook and loop fastener provided on said mounting portion and said decorative piece.

* * * * *